United States Patent
Martinie

[15] 3,683,421
[45] Aug. 15, 1972

[54] PROSTHETIC JOINT ASSEMBLY

[72] Inventor: Howard M. Martinie, King of Prussia, Pa.

[73] Assignee: SKF Industries, Inc., King of Prussia, Pa.

[22] Filed: July 13, 1970

[21] Appl. No.: 54,523

[52] U.S. Cl. ............3/1, 128/92 C, 128/92 CA, 287/87, 277/212 FB
[51] Int. Cl. ............................A61f 1/24
[58] Field of Search.......3/1; 128/92 R, 92 C, 92 CA, 128/92 BA, 92 BB; 287/87; 277/212 R, 212 C, 212 F, 212 FB

[56] References Cited

UNITED STATES PATENTS

| 3,067,740 | 12/1962 | Haboush | 128/92 CA |
| 2,455,343 | 11/1948 | Slack et al. | 287/87 |

FOREIGN PATENTS OR APPLICATIONS

| 124,585 | 1/1960 | U.S.S.R. | 128/92 CA |
| 80,881 | 5/1963 | France | 128/92 C |
| 1,047,640 | 7/1953 | France | 128/92 C |

OTHER PUBLICATIONS

" Factors in the Design of an Artificial Hip Joint" by J. Charnley, The Institute of Mechanical Engineers, Proceedings 1966–67 Vol. 181, Part 3J, page 106–107 relied upon.
" Arthroplasty of the Hip Using Foreign Materials: A History" by J. T. Scales, The Institute of Mech. Engineers, Proceedings. 1966–67, Vol. 181, Part 3J, pages 74–75 Relied upon.

Primary Examiner—Richard A. Gaudet
Assistant Examiner—Ronald L. Frinks
Attorney—Howson and Howson

[57] ABSTRACT

A prosthetic joint assembly for supporting first and second bone members for relative movement comprising a pin member adapted to seat in a pocket formed in the first bone member, a socket assembly adapted to be mounted in the second bone member, a connecting member connected at one end to said pin member and having at its opposite end a ball journalled in the socket assembly and an outer seal member defining a lubricant pocket for the ball end of the connecting member and seat.

10 Claims, 9 Drawing Figures

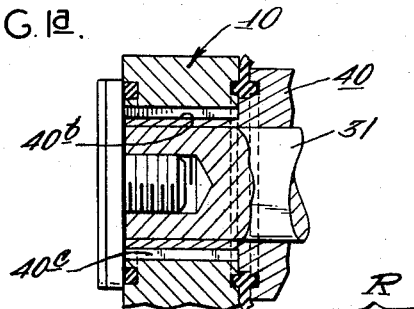
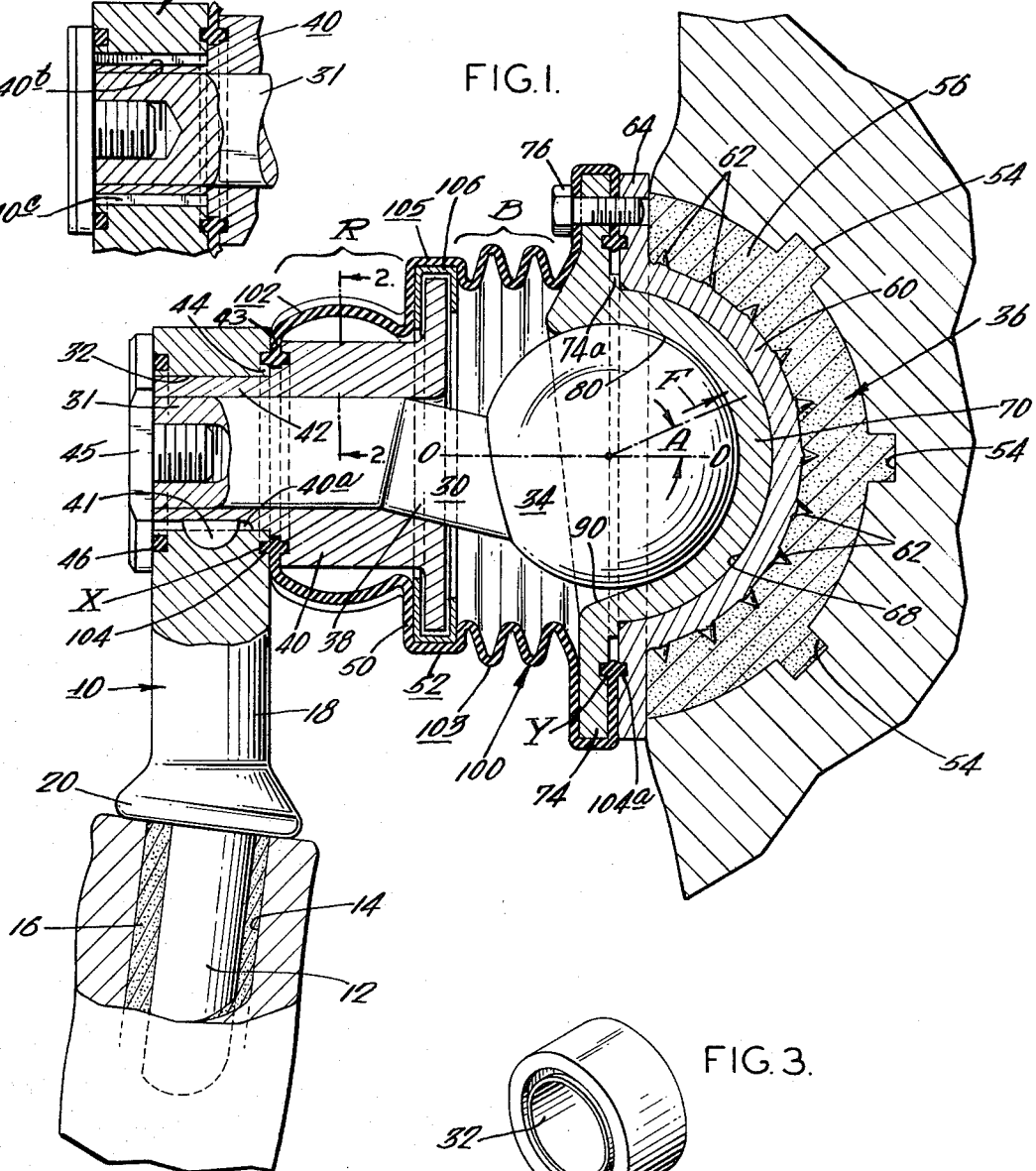
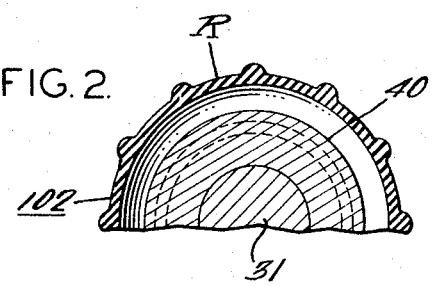
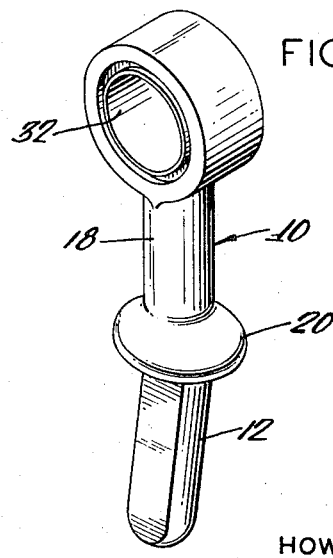

INVENTOR:
HOWARD M. MARTINIE 3,683,421

PROSTHETIC JOINT ASSEMBLY

The present invention relates to surgical apparatus or appliances and more particularly to an improved form of hip joint prosthesis adapted to surgically repair a damaged ball and/or socket of the hip joint.

The surgical apparatus of the present invention is particularly suited for use in cases where the damage to the hip joint is so extensive that it can not be repaired by conventional means such as bone nails or bone plates. Various ball and socket-type surgical appliances have been proposed for use in these instances. However, they have not proven entirely satisfactory for a number of reasons. For example, some of the apparatus proposed are generally extremely complex so that they are difficult and time consuming to install. Additionally, in most instances metallic parts of these prior prosthetic apparatus are exposed to the body fluids and thus tend to corrode or deteriorate over a period of time. These units are lubricated only by the body fluids which are poor lubricants and allow metal to metal contact with resulting wear. The debris from this wear is expelled from the joint into the tissue. Debris, even from materials which are body compatible in bulk, is rejected by the body causing pain and necessitating removal of the joint. Often it is not possible to replace the joint necessitating fusing of the joint and causing immobility of the limb. In these instances the entire apparatus has to be removed and replaced which is time consuming and a tedious process for the patient in reacclimating to the new apparatus.

The present invention provides an improvement in prosthetic hip joints which is of extremely simplified construction, and which is truly effective for the purposes intended. The apparatus comprises a femur stem member adapted to be secured to the femur and a ball stem rigidly mounted at one end of the femur pin member, the ball stem being rotatably journalled in a socket which seats in the acetabulum in the hip joint. All of the moving parts of the apparatus are enclosed in a sealed housing which contains a suitable supply of a non-toxic lubricant thereby eliminating the need for depending on local body fluids for lubrication of the apparatus, which body fluids may tend to corrode the moving parts thereof.

In view of the above, an object of the present invention is to provide a completely encapsulated surgical apparatus which is effectively lubricated thereby minimizing friction and wear and providing effectively a lifetime apparatus.

A further object of the present invention is to provide a substantially encapsulated lubricated apparatus wherein the lubricant and moving parts and any wear debris are segregated from the body tissues, thereby eliminating irritation from these sources.

A still further object is to provide a completely lubricated encapsulated apparatus wherein the moving parts are protected from the corrosive body fluids.

Still another object of the present invention is to provide an encapsulated apparatus which is fully separable from the mountings and thus can be replaced by soft tissue surgery and thus eliminates the current need in prior apparatus for disturbing bone attachments.

Still a further object of the present invention is to provide an apparatus of the above type having a novel seal arrangement which accommodates the compound oscillatory motion of the joint which is a combination of motions about three othogonal axes.

These and other objects of the present invention and the various features and details of the operation and construction thereof are hereinafter more fully set forth with reference to the accompanying drawings wherein:

FIG. 1 is a side elevational view of a prosthetic hip joint in accordance with the present invention with parts in section to show the internal construction more clearly;

FIG. 1a is a sectional view of a modified means for securing the flanged sleeve member to the femur pin of the prosthetic hip assembly;

FIG. 2 is a sectional view taken on lines 2—2 of FIG. 1;

FIG. 3 is a perspective view of the femur pin member;

Figure 4:
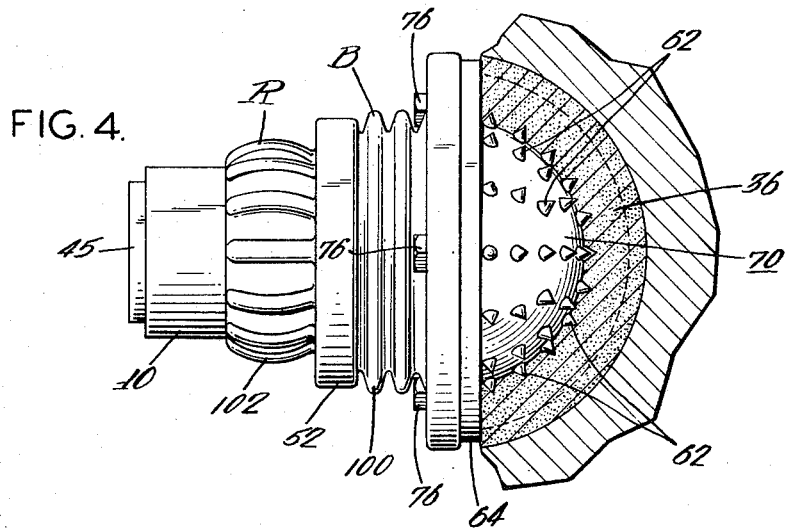
FIG. 4 is a plan view at a reduced scale of the prosthetic hip joint assembly of FIG. 1 with the socket end shown in section.

Referring now to the drawings and particularly to FIG. 1 thereof, the prosthetic apparatus comprises a femur pin member 10 having a lower section 12 adapted to seat in a cavity or pocket 14 in the femur. It is noted that in the surgery required for installation of the hip joint, the neck, ball and upper end of the femur are removed and the femur stump is drilled or otherwise excavated to provide the pocket 14 for the lower section 12 of the femur pin member 10. Additionally, as noted, in order to provide a tight joint for the lower section 12, the pocket 14 is lined with an acrylic liner 16. The lower section 12 is offset relative to the upper section 18 and is provided with a shoulder 20 at the juncture which seats on the top face of the femur as illustrated.

The apparatus further includes a ball stem connecting member 30 having its stem end 31 rigidly mounted in a cylindrical bore 32 in the upper section of the femur pin member, the ball end 34 being rotatably seated in a socket assembly 36. The stem and ball of the connecting member 30 are connected by an angularly offset section as at 38 for a purpose to be described hereafter. In the present instance, the stem end 31 is rigidly journalled in a flanged sleeve 40 which is of reduced cross section at its inner end as at 42 to provide a shoulder 44 which abuts against one face of the femur pin section 10. The sleeve 40 is mounted to the femur pin member 10 in a manner to prevent relative rotation by means of a key 41 engaging in a slot 40a in the inner reduced end of sleeve 40. The femur pin section 10 and ball stem 31 are mounted together by means of a screw 45, there being an O-ring 46 seated in a groove in the outer face of the femur pin section to provide a stationary seal at this juncture. The sleeve 40 as illustrated has at its opposite terminal end a radially outwardly extending flange portion 50 which serves as a guide member for the outer encapsulating seal assembly 100.

There is illustrated in FIG. 1a a modified means attaching the sleeve 40 to the femur pin. In this instance, the sleeve 40 has a plurality of axial circumferentially spaced grooves 40b and the bore of the femur pin has complementary axial ribs 40c engaging in the grooves 40b.

The socket assembly as illustrated is seated in the acetabulum opening which may be reamed out if necessary to accommodate the socket assembly and is provided, in the present instance, with a plurality of grooves or cutouts 54 to more firmly hold the bottom layer of acrylic 56 within which the socket assembly is mounted. The socket assembly as illustrated comprises an intermediate bone attachment socket 60 which has a plurality of projections or ribs 62 on its outer periphery to more firmly secure it to the acrylic seat 56. It is noted that configurations other than the projections or ribs may be employed to firmly seat the socket 60. This intermediate socket 60 has a radially outwardly extending flange 64 and is formed with a hemispherical seat 68 to receive the bearing socket 70 which closely conforms to the intermediate socket and also has a circumferential flange 74 overlying the flange 64 and is adapted to be secured at this juncture by a plurality of screw members 76. The bearing socket as illustrated has a spherical seat portion 80 which extends 180° and is fixed in an angularly offset position such that the center line of the seat directed inward and upward and is indicated by the arrow F. The spherical portion of the bearing socket runs out at the lower side into a truncated conical section 90. This arrangement also facilitates assembly of the ball stem assembly into the bearing socket. By this arrangement of the device, the ball end 34 is in firm seating engagement with the spherical seat 80 since the muscle load which acts to seat the ball operates in an inward and upward direction.

Another feature of the present invention is the provision of an outer seal member 100 which completely encapsulates the surgical apparatus and defines a pocket for a lubricant to permanently lubricate the relatively moving parts thereof, and to retain any wear debris. The seal further is designed to accommodate the various oscillatory motions of the joint in a manner preventing binding and damage thereto. To this end, the seal assembly 100 comprises two integral sections, a ribbed bulbous section 102, a bellows section 103, and a central section 105 intermediate the sections 102 and 103. The sections 102 and 103 terminate in inwardly directed terminal flange portions with integral X-shaped beads 104 and 104a, the bead 104 seating in confronting grooves in the shoulder of the sleeve 104 and the side face 43 of the femur pin section to provide a fluid tight joint at this juncture and the bead 104 seating in confronting grooves in the flanges 64 and 74 of the sockets 60 and 70. It is noted that the flange 74 is undercut as at 74a to define a shoulder which abuts the flange 64 to prevent undue compression of the X-shaped sealing bead 104a.

The central section 105 of the seal circumscribes a metal ring 106 which in turn circumscribes with a radial clearance the flange of the sleeve 40. This arrangement serves to transmit a rocking motion of the leg to the bellows portion 103 of the seal. The static seals at the outer terminal ends of the bellows section and ribbed bulbous section exclude body fluids from entering these areas where corrosion is more likely to occur. The seal is preferably of a resilient material of body-compatible rubber, for example silicone rubber, and may be reinforced with fabric for strength, or of laminated construction to provide the necessary properties of strength, flexibility, body compatibility, and lubricant compatibility. The seal being an integral unit and attached to the assembly at X and Y allows the unit to be handled and sterilized as needed.

As mentioned above, the seal consists of two integral sections joined at the central section 105. The ribbed bulbous section has an inwardly directed terminal flange portion which is clamped axially at X between members 40 and 10. This clamping action results from screw 45 and assures that no relative motion takes place between members 40 and 10.

Seal section R is designed to accommodate the rotation of member 42 and the attached ball 34 about the axis 0—0. Seal section B is comprised of a bellows type seal which will accommodate rocking motions of the axis o—0. Said rotation occurs during normal walking while the rocking motion is that of a sideward step. The sleeve 40 adjacent to the seal center section 106 is free to rotate in relation to the seal at that point. The sleeve 40 acts as a guide to assure that these different motions are directed to the appropriate portion of the seal.

Figure 5:
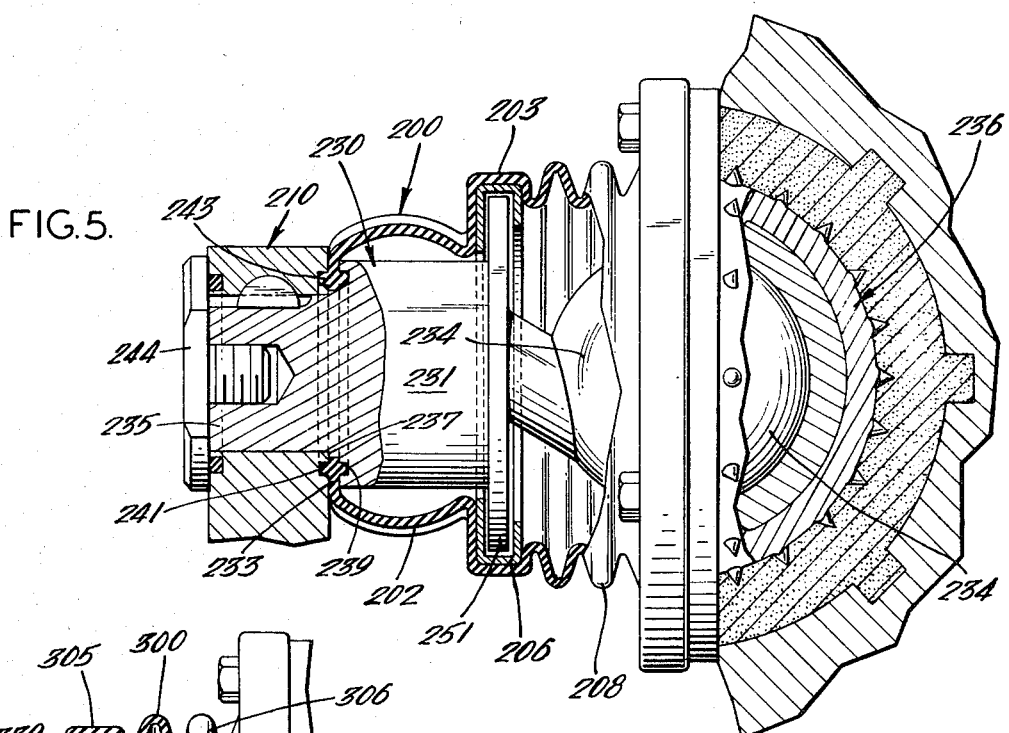
FIG. 5 is a side elevational view partly in section of a second embodiment of prosthetic hip joint assembly in accordance with the present invention.

There is illustrated in FIG. 5 another embodiment of hip joint in accordance with the present invention. This embodiment also includes a femur pin member 210 of identical construction to that described in the previous embodiment which is adapted to seat in a cavity or pocket in the femur [not shown]. The assembly also includes a ball stem connecting member 230 having a ball end 234 rotatably seated in a socket assembly 236. In the present instance the ball stem connecting member has an enlarged cylindrical central section 231 having a stepped configuration 233 adjacent the reduced terminal end portion 235 defining a shoulder 237 which is adapted to abut the inner face of the upper end of the femur pin section 10. By this arrangement when the connecting screw 244 is threaded into the threaded bore in the terminal end portion 235, the femur pin section 210 is rigidly connected to the ball stem connecting member 230. The stepped configuration also includes a circumferentially extending groove 239 in the axial end face confronting the femur pin section 210 which is aligned with the circumferentially extending groove 241 in the femur pin section 210 to define a channel for the X-shaped bead 243 of the outer seal member 200. It is noted that the shoulder abutment 237 insures against overtightening of the elements around the X-shaped sealing bead 243. The cylindrical center section 231 of the ball stem connecting member 230 terminates in a radially extending flange 251 which as illustrated seats in and serves as a guide for the center section of the seal assembly 200. More specifically, the seal assembly as in the previously described embodiment comprises a first section 202 which is a ribbed bulbous portion and an intermediate section 203 of U-shaped cross section which circumscribes a metal ring 206 which seats over the flange 251 and a bellows section 208 secured to elements of the socket assembly 236 in the same manner as in the previously described embodiment.

Figure 6:
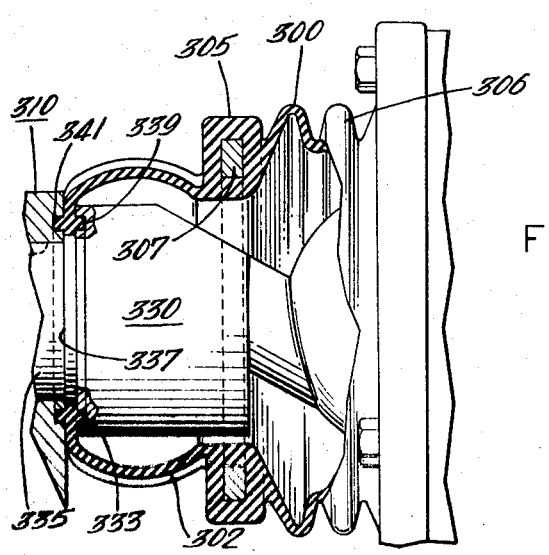
FIG. 6 is a fragmentary view partly in section of a third embodiment of hip joint assembly.

There is illustrated in FIG. 6 a further modification of the prosthetic hip joint in accordance with the presnet invention which is generally similar in overall detail and arrangement to that described in FIGS. 1 and 5. The assembly thus includes the femur pin member 310 and a ball stem connecting assembly 330 and an outer seal assembly 300 which circumscribes and encloses the major portion of the ball stem connecting member 330.

As in the previously described embodiment, the center section 330 has a stepped configuration at the juncture with the reduced terminal end portion 335 which engages in the opening in the femur pin section 310 including a shoulder 337 which abuts the femur pin section and confronting aligned circumferentially extending grooves 339 and 341 in the axial end face of the center section 330 and femur pin section 310 respectively to receive the X-shaped terminal end seal 333 of the outer seal assembly 300. The center section does not include a radial flange at its opposite end and to this end the seal assembly which is similar to the previously described embodiment includes the ribbed bulbous section 302 and the bellows section 306. However, in the present instance the intermediate section 305 is of generally square cross section and has imbedded therein a stiffening or rigidifying ring 307 made, for example, of metal.

Figure 7:
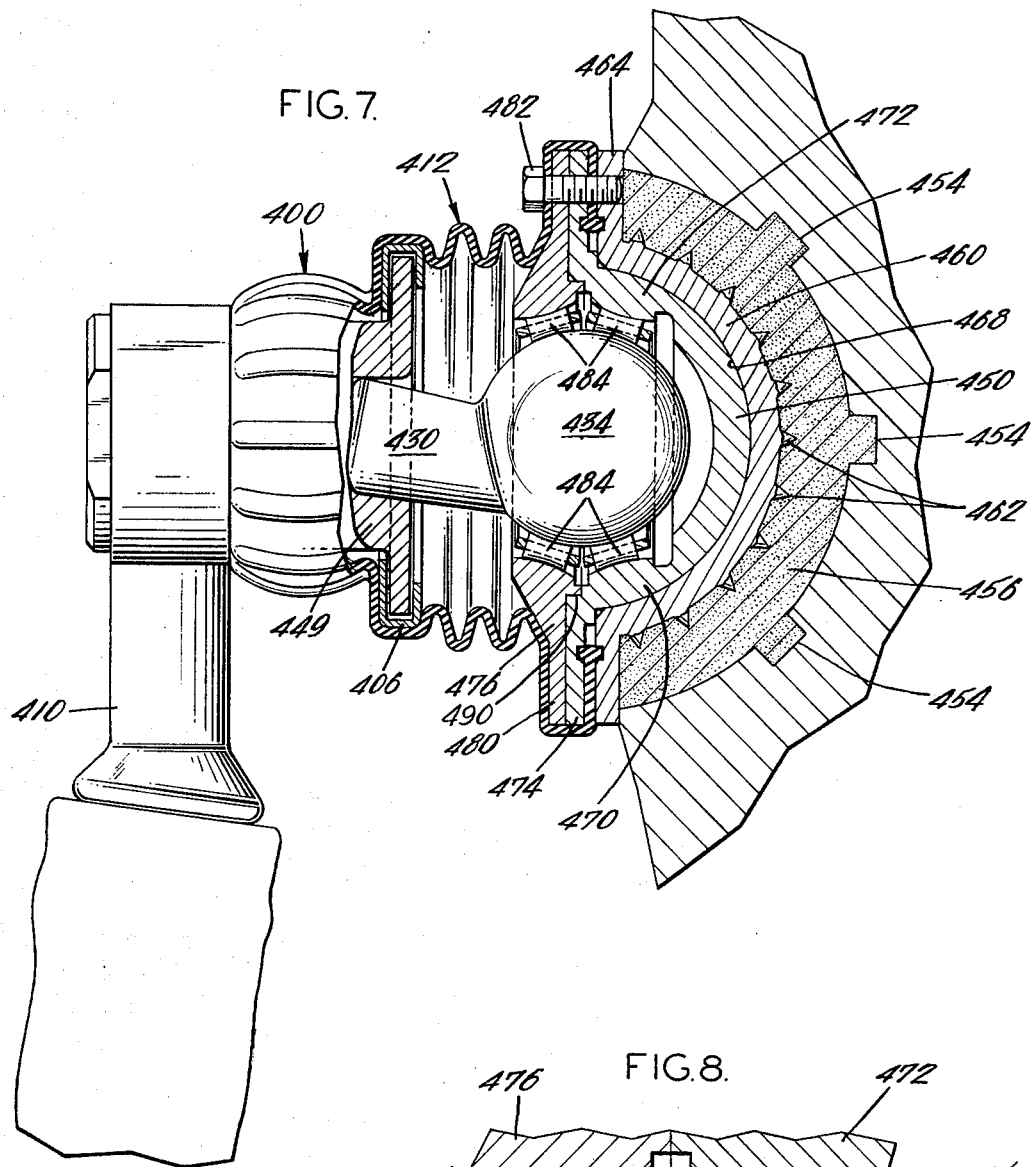
FIG. 7 is a side elevational view partly in section of a fourth embodiment of hip joint assembly in accordance with the present invention.
Figure 8:
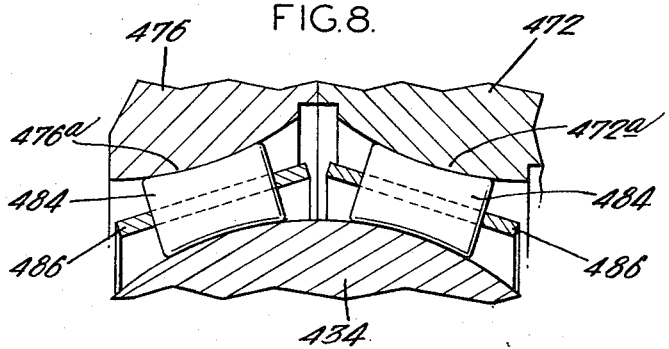
FIG. 8 is an enlarged fragmentary sectional view illustrating a detail of FIG. 7.

There is illustrated in FIGS. 7 and 8 a further embodiment of prosthetic hip joint assembly in accordance with the present invention. This assembly, which is generally designated by the numeral 400 includes a femur pin section 410 of identical construction to the previous embodiments, a ball stem connecting member 430 having one end rigidly mounted in the femur pin section 410 and being generally identical to the ball stem connecting member 30 of the first described embodiment, a flanged sleeve 449 circumscribing a portion of the ball stem connecting member 430 and an outer seal assembly 412 which seals the components of the prosthetic hip joint assembly.

In the present instance the socket assembly generally designated by the numeral 450 is mounted in the acetabulum opening in the same manner as in the previously described embodiments and includes a layer of acrylic 456 within which the socket assembly is mounted and which as illustrated is held more firmly in place by grooves or cutouts 454 in the acetabulum bone. The socket assembly further includes an intermediate bone attachment socket 460 which has a plurality of ribs 462 on its outer periphery to more firmly secure to the acrylic seat 456. The intermediate socket 460 has a radially outwardly extending flange 464 and is formed with a hemispherical seat 468 to receive the bearing socket assembly 470. The bearing socket assembly in the present instance is in two pieces comprising first and second sections 472, 476, the first section having an outer peripheral hemispherical shape to seat in the intermediate bone attachment socket 460 and a radial flange 474 which overlies the flange 464 and between which the turned in outer peripheral flange of the bellows section of the seal is secured. The outer section 476 also has an outwardly directed radial flange 480 which confronts and overlies the flange 470 of the inner section, the three flanges being integrally secured by a plurality of screw fasteners 482.

In the present instance the ball end of the ball stem connecting member 430 is rotatably journalled in the bearing socket assembly 470 by a roller bearing assembly broadly designated by the numeral 482. More specifically, the roller bearing assembly consists of two rows of rollers, each row comprising a plurality of rollers 484 which are of an hourglass or "dog bone" shape and which as illustrated are circumferentially spaced by conventional roller bearing window-type cages 486. The rollers, as illustrated, have an outer peripheral surface conforming to the contour of the ball end 434. In the present instance the bearing socket assembly is formed with raceways for supporting the rollers. More specifically, the first and second sections 472 and 476 have circumferentially extending convex raceway surfaces 472a and 476a conforming to the outer curvature of the rollers. As illustrated, the first and second sections are of a configuration defining a shoulder 490 so that upon assembly they properly align to position the raceways so that they take the uniform load from both rows of rollers.

I claim:

1. A prosthetic joint assembly for supporting first and second bone members for relative movement comprising a pin member adapted to seat in a pocket formed in the first bone member, a socket assembly adapted to be mounted in the second bone member including a bearing socket having a spherical seat, a connecting member having a stem end rigidly secured to said pin member and having at its opposite end a ball journalled in the seat of said bearing socket and an angularly offset section connecting said stem end and ball and an outer seal member defining a sealed lubricant pocket connected at one end adjacent said stem end and at its opposite end adjacent said bearing socket thereby enclosing the ball end of the connecting member and seat, said stem being in a plane disposed transversely relative to said pin member and said offset section being angularly disposed in a downwardly direction relative to the plane of said stem whereby the forces acting on said prosthetic assembly act in a direction tending to firmly seat said ball in said seat of the bearing pocket.

2. A prosthetic joint assembly as claimed in claim 1 wherein said spherical seat extends at least 180° and is faced in an angularly offset position so that the center line of the seat is directed inwardly and upwardly, the lower side of said spherical seat terminating in a truncated conical section.

3. A prosthetic joint assembly as claimed in claim 1 including a flanged sleeve circumscribing the stem end of said connecting member, said sleeve being of reduced cross section at one end engaging on a bore in said pin and providing a shoulder abutting said pin around said bore.

4. A prosthetic joint assembly as claimed in claim 3 including means for mounting said sleeve stem end to said pin in a manner preventing relative rotation.

5. A prosthetic joint assembly as claimed in claim 3 including confronting circumferentially extending grooves in said shoulder and pin to receive one terminal end of said seal assembly which has an X-shaped bead to provide a fluid-tight joint at this juncture.

6. A prosthetic joint assembly as claimed in claim 3 wherein said sleeve includes a radially outwardly projecting flange and wherein said seal assembly comprises a ribbed bulbous section surrounding said sleeve, a bellows section surrounding the ball end and a central section supporting a ring which is spaced from and overlies said flange.

7. A prosthetic joint assembly as claimed in claim 1 wherein said ball is supported in said socket assembly by means of two rows of rollers, each roller being hourglass configuration to conform to the contour of the ball and wherein a pair of circumferential raceways are formed in the socket assembly for the rollers.

8. A prosthetic joint assembly as claimed in claim 1 wherein said connecting member stem end engages directly in said pin and has formed integrally therewith a radially outward circumferentially extending flange for serving as a guide for the seal assembly.

9. A prosthetic joint assembly for supporting first and second bone members for relative movement comprising a pin member adapted to seat in a pocket formed in the first bone member, a socket assembly adapted to be mounted in the second bone member, including a bearing socket having a spherical seat, a connecting member connected at one end to said pin member and having at its opposite end a ball journalled in the socket assembly and an outer seal member connected at one end adjacent the pin member and at its opposite end adjacent said bearing socket defining a lubricant pocket for the ball end of the connecting member and seat, said seal member comprising a ribbed bulbous section, a bellows section and a central section having imbedded therein a rigidifying ring.

10. A prosthetic joint assembly for supporting first and second bone members for relative movement comprising a pin member adapted to seat in a pocket formed in the first bone member, a socket assembly adapted to be mounted in the second bone member including a bearing socket having a spherical seat, a connecting member having a stem end rigidly secured to said pin member and having at its opposite end a ball journalled in the seat of said bearing socket and an outer seal member defining a sealed lubricant pocket for the ball end of the connecting member and seat, said outer seal member extending from adjacent the pin member to said bearing socket in sealing engagement therewith and comprising first and second sections connected by a central section, said first section having means operable to withstand twisting thereby accommodating rotating movement of the parts and said second section having means operable to withstand compression and extension thereby accommodating limited universal movement of the ball and bearing socket relative to one another, said central section providing separating means insuring said twisting, compression and extension of the seal are directed to the appropriate sections during relative movement of the parts.

* * * * *